June 24, 1941.     T. F. JOHNSON     2,246,630
LINE IMPLEMENT
Filed March 28, 1940
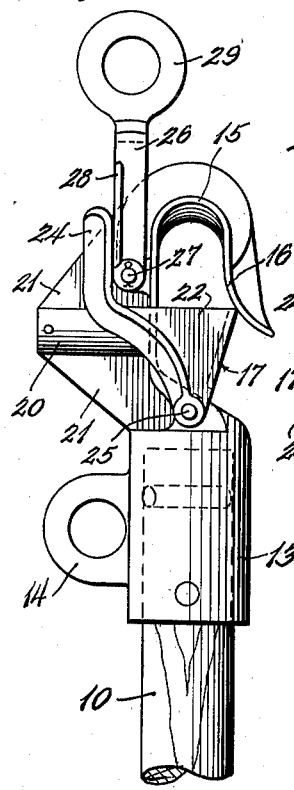
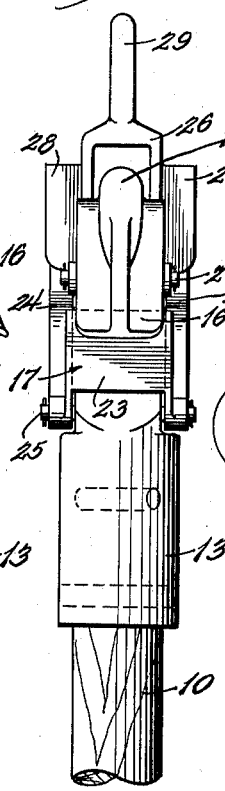
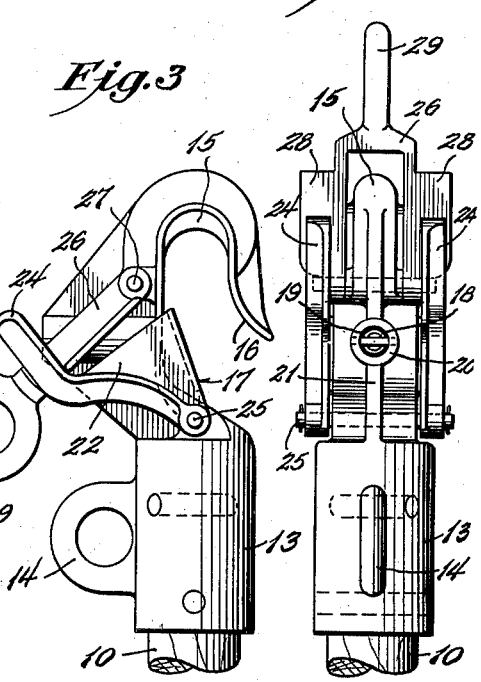
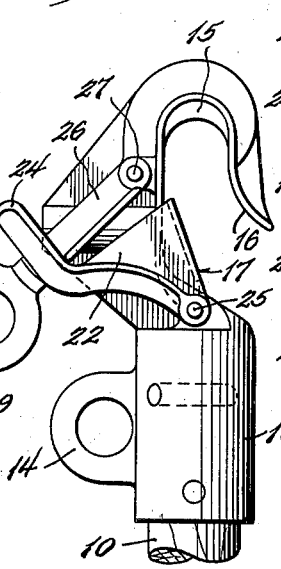
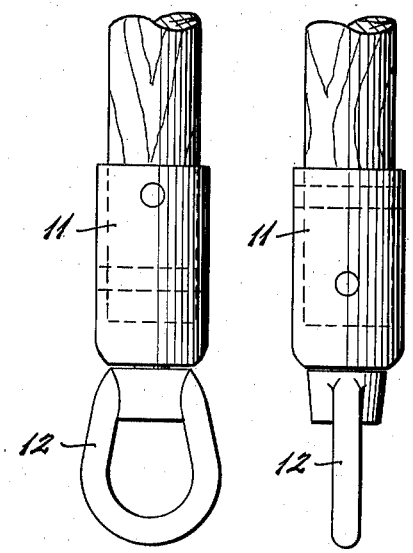
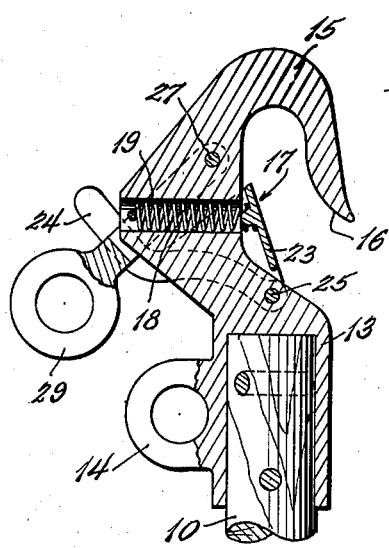
Inventor
T. F. Johnson
By A. D. Adams
Attorney Patented June 24, 1941

2,246,630

UNITED STATES PATENT OFFICE 2,246,630

LINE IMPLEMENT

Tomlinson F. Johnson, Atlanta, Ga.

Application March 28, 1940, Serial No. 326,542

6 Claims. (Cl. 294—19)

This invention relates to manipulating tools or implements for high tension transmission lines and, among other objects, aims to provide a relatively simple and inexpensive tension stick adapted to be used on live transmission conductors for a variety of purposes. The main idea is to provide an insulated tension stick having a novel type of safety latch for a line engaging hook, so constructed as to permit the hook to be readily engaged with a conductor and prevent accidental disengagement therefrom.

Other aims and advantages of the invention will appear in the specification, when considered in connection with the accompanying drawing, wherein:

Fig. 1 is a side elevation of a tension stick embodying the invention showing the latch in closed position;

Fig. 2 is a front elevation of the implement shown in Fig. 1;

Fig. 3 is a side elevation of the hook portion of the implement showing the latch in open position;

Fig. 4 is a rear elevation of the upper portion of the implement shown in Fig. 1; and Fig. 5 is a vertical, longitudinal sectional view of the hook portion with the parts in the position shown in Fig. 3.

Referring particularly to the drawing, the manipulating implement there shown is of the type generally known in the art as a "fuzz stick" for handling live lines by means of rope tackles. It consists of a stick or rod 10 made of hard wood or other suitable insulating material and has a ferrule 11 carrying a swivel eye 12 at the lower end adapted to receive a rope or a hook on the tackle. The upper end has a collar 13 with a hook eye 14 on the back and an integral hook 15 with a curved bill 16 adapted to engage a conductor.

Such implements are usually hooked over a conductor to move it laterally with respect to an insulator after the conductor is detached from the insulator, so that the insulator may be replaced. In some instances, it is hooked over a clamp and used in connection with a rope tackle to apply axial tension to a conductor.

To prevent the hook from being disengaged, there is shown a spring urged latch member 17 biased by a coil compression spring 18 in a bore 19 of a cylindrical boss 20 on the back of the hook. The hook and the boss are reinforced by webs or ribs 21. The latch has side plates 22 connected by a web 23 contacting the inside of the bill 16 of the hook. The latch member has a pair of cam arms 24 extending upwardly and rearwardly from the side plates 22 and straddling the body of the hook. The latch is pivoted on a pivot pin 25 extending through the upper end of the collar or ferrule and the arms 24 have flanges presenting curved upper faces cooperating with a latch operating member in the form of a bifurcated lever 26 straddling the upper portion of the hook and pivoted on a pivot pin 27 below the upper ends of the two arms 24. This lever has a pair of lateral flanges 28, the upper ends of which are adapted to engage a straight portion of the arms 24 as shown in Fig. 3, to hold the latch in open position. The flanges 28 initially ride on the upper ends of the arms 24 when the lever is swung toward the left, as viewed in Fig. 1. It is adapted to be operated by a switch hook engaging an integral eye 29 at the top of the lever. The eye 29 lies in the same plane as the eye 14 so that both eyes are accessible from the same side of the implement. The implement may be hooked on or removed from a conductor and the latch operated by a single manipulating implement or switch hook of the proper length.

From the foregoing description, it will be seen that the tension stick is very simple in construction and easy to manufacture and assemble. It is absolutely dependable in operation and cannot be accidentally disengaged from a hot line. The length of the insulating stick is such that it is safe to handle between a rope tackle and hot line.

Obviously, the present invention is not restricted to the particular embodiment thereof herein shown and described.

What is claimed is:

1. In combination with an insulated tension stick having a hook adapted to engage a high tension conductor, an automatic engaging spring urged latch cooperating with the hook and normally biased to prevent the hook from being disengaged from the conductor; and manual means for releasing the latch.

2. A manipulating implement for high tension conductors comprising, in combination, an insulated stick having a swivel connection on one end and a hook member on the other end; a latch member pivotally mounted on the hook member below its bight portion; spring means connected to the latch normally to hold the latch engaged with the bill portion of the hook; and latch releasing means on the hook member cooperating with the latch to release said latch and hold it in released position.

3. A manipulating implement for high tension conductors comprising, in combination, an insulated stick having a swivel connection on one end and a hook member on the other end; a latch member pivotally mounted on the hook member below its bight portion; spring means connected to the latch normally to hold the latch engaged with the bill portion of the hook; and latch releasing means on the hook member cooperating with the latch to release said latch and hold it in released position, said latch releasing means having an eye portion adapted to be engaged by a switch hook.

4. In a high tension stick of the class described having a swivel connection at one end and a conductor engaging hook at the other end; a spring urged latch pivoted on the hook biased normally to permit engagement of the hook on the conductor and to prevent disengagement therefrom; and a lever pivoted on the hook and cooperating with the latch to open said latch and hold it in open position when the lever is operated to permit the hook to be removed from the conductor.

5. In a tension stick of the class described having a swivel connection at one end and a conductor engaging hook at the other end; a spring urged latch pivoted on the hook biased normally to permit engagement of the hook on the conductor and to prevent disengagement therefrom; cam arms on the latch; and a lever pivoted on the hook and having means cooperating with the cam arms to open said latch and hold it in open position when the lever is operated to permit the hook to be removed from the conductor.

6. In a tension stick of the class described having a swivel connection at one end and a conductor engaging hook at the other end; a spring urged latch pivoted on the hook biased normally to permit engagement of the hook on the conductor and to prevent disengagement therefrom, said latch being bifurcated and having cam arms straddling the hook; a bifurcated lever pivoted on the hook and having flanges cooperating with the cam arms to open said latch and hold it in open position when the lever is operated to permit the hook to be removed from the conductor; and a hook eye on the lever adapted to be engaged by a switch hook to operate the lever.

TOMLINSON F. JOHNSON.